United States Patent
Kontz et al.

[11] 3,919,375
[45] Nov. 11, 1975

[54] PARISON ENGAGING, SEVERING AND STRIPPING METHOD

[75] Inventors: Robert F. Kontz, Toledo, Ohio; Richard A. Morrette, Temperance, Mich.

[73] Assignee: Owens-Illinois, Inc., Toledo, Ohio

[22] Filed: Dec. 6, 1973

[21] Appl. No.: 422,311

Related U.S. Application Data
[62] Division of Ser. No. 220,857, Jan. 26, 1972, Pat. No. 3,796,530.

[52] U.S. Cl. .............. 264/99; 264/150; 264/151; 264/161
[51] Int. Cl.² .............. B29C 17/07; B29C 17/12; B29C 17/14
[58] Field of Search ........... 264/89, 90, 92, 94, 96, 264/98, 99, 150, 161, 163, 151; 425/DIG. 212, 297, 302 B, 305 B

[56] References Cited
UNITED STATES PATENTS

| | | | |
|---|---|---|---|
| 3,211,815 | 10/1965 | Cordiale et al. | 264/98 X |
| 3,217,071 | 11/1965 | Plymale et al. | 264/98 |
| 3,382,532 | 5/1968 | Schweiger | 425/305 B X |
| 3,504,396 | 4/1970 | Button et al. | 264/99 X |
| 3,665,063 | 5/1972 | Rupert et al. | 264/98 X |

*Primary Examiner*—Jan H. Silbaugh
*Attorney, Agent, or Firm*—Philip M. Rice; E. J. Holler

[57] ABSTRACT

A method for engaging a freely extruded tubular parison prior to closure of a separable blow mold to position the parison for a subsequent blow molding operation, to sever the parison prior to closure of the blow mold and to insure proper stripping of the blown parison from the blow mold as the mold is opened following blowing.

5 Claims, 7 Drawing Figures

PARISON ENGAGING, SEVERING AND STRIPPING METHOD

RELATED APPLICATIONS

This is a division of our copending application, Ser. No. 220,857, filed Jan. 26, 1972, now U.S. Pat. No. 3,796,530.

The mechanism of the present invention is particularly adapted for and intended for use with the method and apparatus disclosed in the pending patent application of Donald H. Criss and Irwin P. Pollitt, Ser. No. 835,091, filed in the United States Patent Office on June 20, 1969, now U.S. Pat. No. 3,652,751.

BRIEF DESCRIPTION OF THE INVENTION

Probably the most common type of blow molding machine is the so-called "free extrusion" type machine, wherein, a free dependent tube of plasticized, thermoplastic material is issued from a downwardly directed orifice. As the tube issues from the orifice, a sectional blow mold is closed on the tube, the mold moves downwardly with the tube as successive portions of the tube are extruded, and the mold-enclosed portion of the tube or the "parison" is inflated interiorly of the closed blow mold. The blow mold then is opened and the blown article is removed therefrom.

In the past, some difficulties have been encountered in properly positioning the extruded tubular parison interiorly of the blow mold prior to closure of the blow mold thereon. Any axial misalignment between the tube and the blow mold cavity results in the generation of excessive flash, the formation of a blown article of unequal peripheral wall thickness, and difficulty in properly aligning the blowing mechanism with the parison.

Further difficulties have been encountered in removing the blown article from the blow mold cavity upon opening of the blow mold sections. If the blown article releases from one section of the blow mold, but hangs up in the other section, then succeeding portions of the tube are not properly axially aligned with the blow mold subsequently closed thereon, and all of the above difficulties are encountered.

Following the complete blow molding and stripping operation, a severing knife usually is employed to cut the blown article from the remainder of the extruded parison. Such a knife generally requires mounting on the mold, and a separate knife-actuating mechanism must be provided for operating in timed sequence with the remainder of the molding apparatus. These severing systems are complicated and expensive, and precautions must be taken to prevent radial displacement of the extruded parison when utilizing such a severing system.

All of the above difficulties are encountered to an exaggerated degree during extremely high speed blow molding operations, such as are carried out by utilization of the apparatus and method of the above identified Criss, et al application, assigned to the assignee of the present invention.

BRIEF DESCRIPTION OF THE PRESENT INVENTION

The present invention now provides an extremely simple, inexpensive method for centering the tubular parison with respect to the mold cavity defined by a pair of separable molds, for severing the tubular parison prior to the blowing operation rather than after the blowing operation, and for accurately and quickly stripping the blown article from the mold cavity and retaining the article in accurate alignment with subsequently extruded parison portions. Further, all of this is carried out without any extraneous actuating mechanism, without the necessity of sensor controls, and as a consequence of the primary machine function of opening and closing the blow molds themselves.

Thus, the method of the present invention is particularly adapted for utilization with extremely high speed blow molding machines such as that disclosed in the above identified Criss, et al application. Of course, the method of the present invention can be utilized with other types of blow mold machines. For example, the above identified Criss, et al apparatus and method utilized swingable, arcuately closable blow mold sections and the device of the present invention is well adapted to this type of blow mold. However, it is equally adaptable for utilization with linearly closable blow molds actuated by separate blow mold closing cylinders.

In essence, the method of the present invention employs a pair of parison-engaging elements mounted at one axial extremity of each blow mold section. Preferably, and as illustrated, this is the lower or leading end of the blow mold sections, but the parison-engaging elements can also be located at the trailing end of the blow mold sections. The parison-engaging elements are slidably mounted on each of the blow mold sections for movement in a plane essentially radial to the parison, and the parison-engaging elements project ahead of the blow mold sections, so that the elements engage the parison prior to complete closure of the blow mold sections on the parison. Thus, the elements engage the lower end of the parison to be blown and retain this lower end in a centralized, axially aligned position relative to the blow molds during the remainder of the blow mold closing movement.

Sandwiched between the parison-engaging elements on one of the blow mold sections is fixed a parison-severing knife. This knife also is positioned in advance of the blow mold section to which it is attached, but the knife slightly trails the adjacent parison-engaging element. Thus, the parison is engaged and held in its centered position by the elements prior to being severed by the knife. The engagement of the elements with the parison flatens the parison and positions it for severing by the knife as the blow molds close to their final mold-closed positions.

Following the blow molding operation, the blow mold sections are opened, but the parison-engaging elements remain in contact with the parison exteriorly of the mold cavity and retain the parison in its centered position. Thus, the molded article is retained in its centered position so that it strips equally from the tube blow mold cavity sections as the blow mold halves are opened. Finally, opening of the blow mold halves proceeds to such an extent that the engaging elements disengage the parison and the attached blown article and the blown article is released.

As hereafter explained and when utilized in conjunction with a high speed blow molding machine having a plurality of blow molds, as for example disclosed in Criss, et al. above, the severing operation performed at one mold does not release the previously blown bottle preformed in the preceding mold. This is caused by the utilization of the two spaced tube-engaging elements between which the severing knife severs the parison. The parison-engaging elements carried by the closing mold sections remote from the cavity of the closing mold sections engage the parison below the point of severence. This engagement retains the previously blown article, even after its blow mold sections have opened. This aids in stripping the blown article, since waste portions at both ends of the article are engaged during opening of the blow mold sections.

OBJECTS

It is therefore, an important object of the present invention to provide a method of accurately positioning a parison at a free extrusion blow molding machine for enclosure within a closable blow mold, pinching shut the parison prior to the blow mold closure and severing the pinched portion of the parison during the blow mold closure, followed by retaining the blown article in alignment with the remainder of the extruded parison during opening of the blow mold sections.

Another important object of the present invention is the provision of the method for retaining the parison of a free extrusion blow molding machine in accurate alignment with the blow mold cavity during enclosure of the parison in the blow mold and for insuring complete stripping of the blown article from the blow mold cavity during openings of the blow mold.

A further important object of this invention is the provision of a blow molding method of the free extrusion type, wherein the blow mold sections carry parison-engaging elements engagable with the parison to position the parison for enclosure within the blow mold sections, to sever the parison during closure of the blow mold and to strip the blown article from the blow mold sections as the sections are opened.

It is another, and no less important, object of this invention to provide a parison positioning, severing and stripping method for utilization in a free extrusion blow molding machine, wherein two or more blow molds are closed in succession on an extruded parison and, wherein, the blown article is stripped from the mold cavity while being retained at both its axial extremities as the mold sections are opened.

AS SHOWN ON THE DRAWINGS

Figure 1:
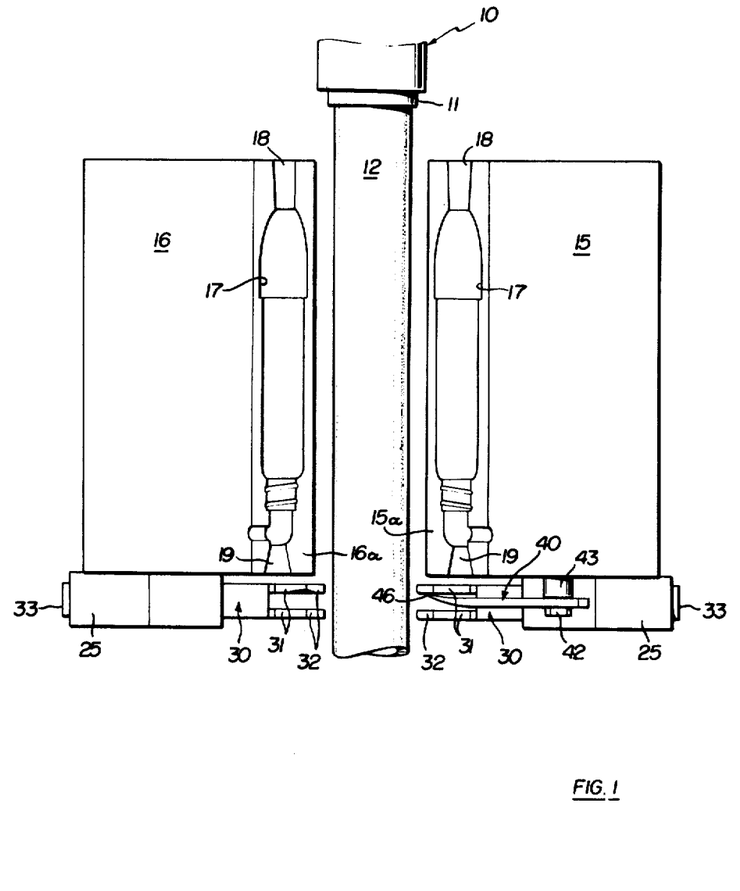
FIG. 1 is a somewhat diagramatic representation of a centering, severing and stripping mechanism of the present invention capable carrying out the method of the present invention.

FIG. 1, reference 10, refers to the outlet nozzle of a screw-type extruder or the like machine having an orifice block 11 from which a freely dependent, downwardly extruded tubular parison 12 is issued. Located beneath the orifice block 11 are blow mold sections 15, 16 having interior partial cavities 17 which cooperatively define a complete mold cavity shaped to the configuration of the article to be blown from the tubular parison 12. These blow mold cavities 17 terminate at their upper ends in tube-engaging portions 18 which engage the tube 12 and pinch it shut. Lower pinching portions 19 of the cavities 17 perform the same function at the lower end of the cavities.

The blow mold sections 15 and 16 open and close arcuately about vertical pivot centers 20 (FIG. 2) which extend vertically and which are offset laterally from the location of the parison 12. Further, the blow mold sections 15 and 16 move vertically relative to the orifice 11, the movement of the blow mold sections 15 and 16 being correlated with the speed of extrusion of the tubular parison 12 which continuously issues from the orifice block 11. The mechanism for supporting the blow molds 15 and 16 for both pivotal movement around the centers 20 and for vertical movement with the extruded parison is disclosed in detail in the above identified pending application of Criss, et al. It is not believed necessary to fully disclose all of this mechanism for supporting and displacing the blow mold sections 15 and 16 in this application.

The blow mold sections 15 and 16 each carry at their lower or leading extremities fixed support blocks 25 secured to the blow mold sections exteriorly of the cavity 17 by suitable means, as by cap screws 26. The support blocks 25 have interior arcuate guide channels 27 for guiding the parison-engaging elements, indicated generally at 30 for transverse movement relative to the guide blocks. More specifically, these elements 30 each comprise a pair of axially spaced, generally rectangular head portions 31 having angular parison-engaging surfaces 32 at their free inner ends and a single arcuate guide portion 33 projecting into and guided by the arcuate guide surfaces 27 in the blocks 25. The arcuate guide portions 33 have a central, vertically opening slot 34 extending therethrough and a compression spring 35 is positioned in each slot, the springs being in contact with the end wall 36 of each slot and with a pin 37 carried by the guide block 25 and projecting through each of the slots 34.

Figure 2:
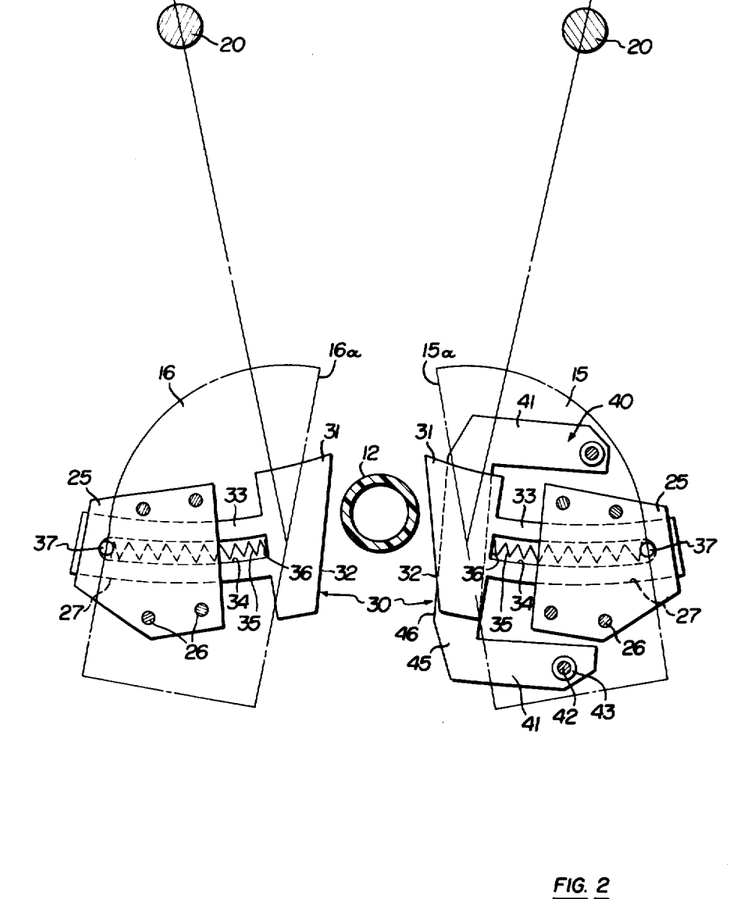
FIG. 2 is a somewhat schematic sectional view illustrating the mechanism of FIG. 1.

As illustrated in FIG. 2, the compression spring 35 reacting against the pin 37 urges the entire parison-engaging element 30 forwardly relative to its block 25 and relative to the mold half 15, 16 with which the element 30 is associated. Further, the parison-engaging surface 32 of the elements 30 project outwardly toward the parison 12 in advance of the abutting faces 15a, 16a of the mold sections 15, 16. Thus, as the mold sections 15, 16 are arcuately displaced around their pivot centers 20 to engage the parison 12, the surfaces 32 of the elements 30 contact the parison 12 prior to any contact between the parison and the mold sections 15, 16.

the springs 35 bias the elements 30 toward the parison 12 and in advance of the mold section faces 15a, 16a, and the springs accommodate displacement of the elements 30 relative to the mold sections 15, 16 as the mold sections close. This operation can be clearly observed by comparison of FIGS. 2 and 4.

Figure 3:
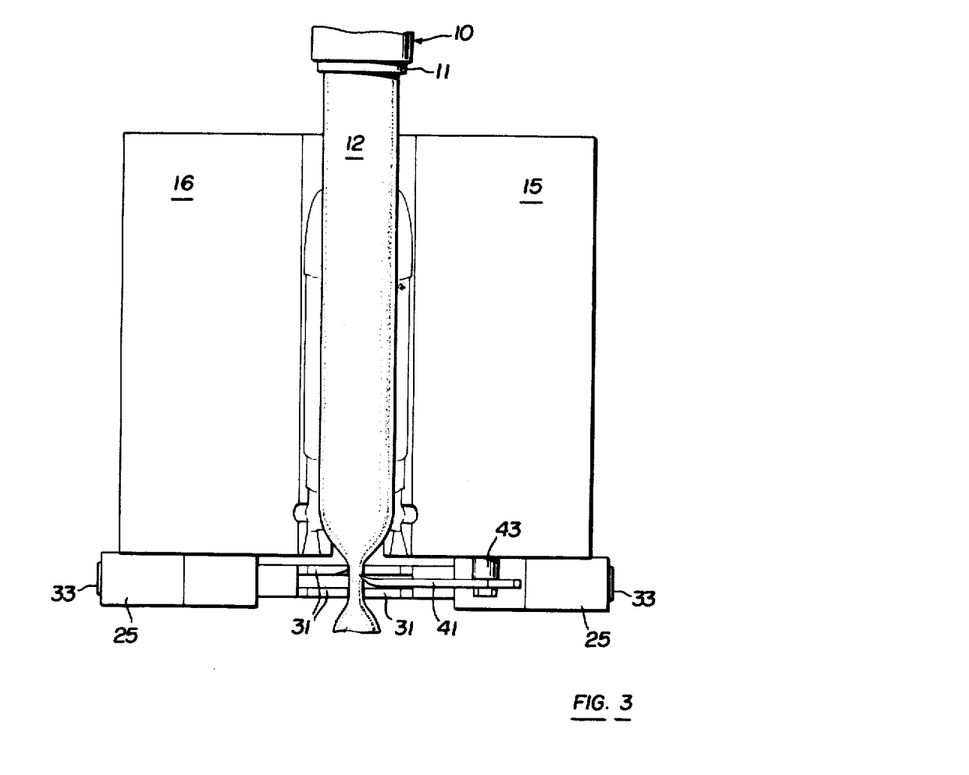
FIG. 3 is a view similar to FIG. 1 showing the blow mold sections closing upon the downwardly extruded parison of FIG. 1.

As above explained, each of the elements 30 comprises a pair of spaced heads 31, and these heads have spaced faces 32 engaging the parison, as best shown in FIG. 3 of the drawings. Interposed between the heads 31 carried by the mold section 15 is a fixed generally U-shaped knife blade 40. This knife blade 40 comprises a pair of parallel support blades 41 having their free ends secured to the mold section 15 by suitable means, as by screw 42 and spacer 43 and a blade portion 45 integral with the legs 41 and having a sharpened leading knife edge 46. The knife 40 thus is rigidly secured to the mold section 15 with the knife edge 46 being always interposed between the parison 12 and the closure face 15a of the mold section 15. When the parison-engaging elements 30 are in their furthest advanced position (FIG. 2), the parison-engaging surfaces 32 carried by the mold section 15 are in advance of the knife blade 46.

Figure 4:
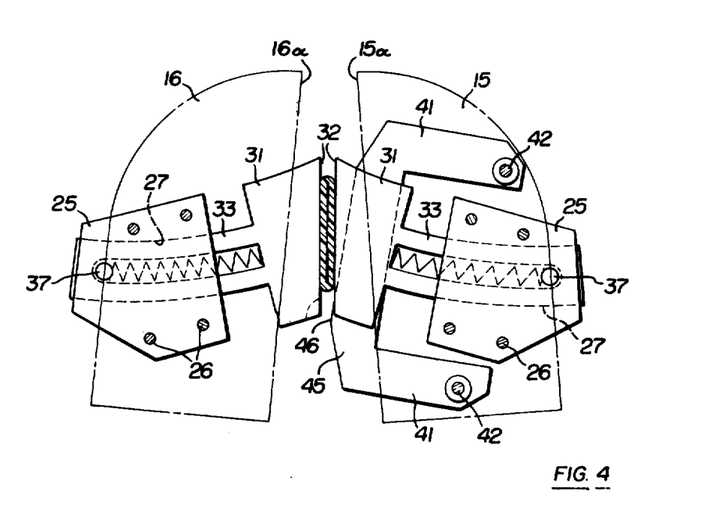
FIG. 4 is a view similar to FIG. 2, but illustrating the relative positions of the elements of FIG. 3.
Figure 5:
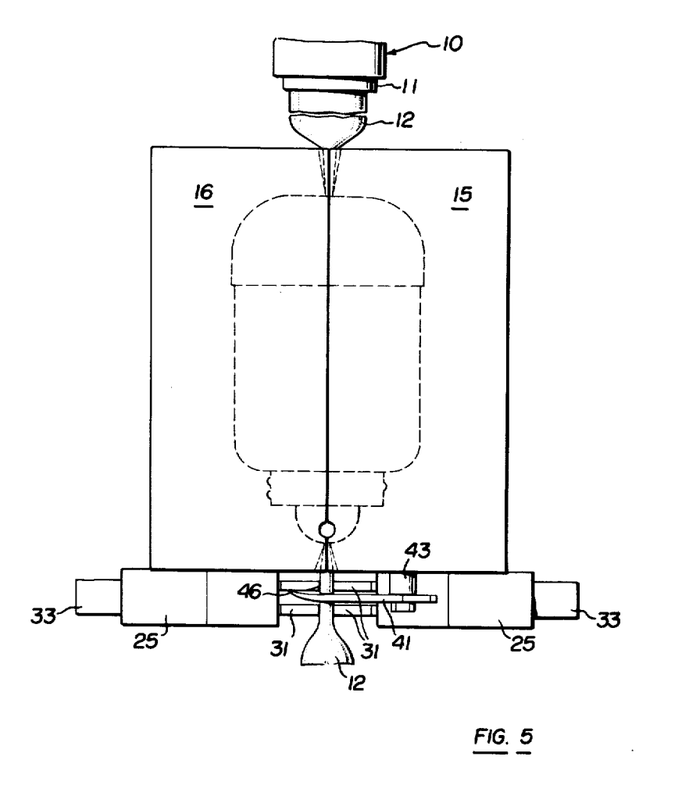
FIG. 5 is a view similar to FIGS. 1 and 3, but illustrating the blow mold sections completely closed and the article blown to its final configuration.

Thus, as may be seen in FIG. 4 of the drawings, the parison 12 is first engaged by the surfaces 32 as the mold sections 15, 16 close. The parison is generally flattened and preferably closed by its abutment with the surfaces 32 prior to engagement of the knife edge 46 with the parison. Continued closing movement of the blow molds to their finally closed positions of FIG. 6 will cause movement of the knife blade through the flattened portion of the parison, effectively severing the parison. The knife edge 46 is received between the two vertically spaced faces 32 of the heads 31 of the parison-engaging element 30 carried by the mold half 16. The interposing of the knife between the two surfaces 32 during final closure of the blow mold insures accurate and effective cutting of the parison between the abuttment surfaces 32.

The operation of the device as above described during closure of the blow mold sections 15, 16 will be readily appreciated. More specifically, the device functions to (1) engage the parison prior to any parison-mold section engagement, thereby centering the parison in accurate alignment with the mold cavity 17 defined by the mold sections 15, 16; (2) surfaces 32 pinch the parison shut prior to severing by the knife edge 46; and (3) the knife edge 46 moves through the pinches parison as the pinched parison is held rigidly between the spaced abuttment surfaces 32.

Figure 6:
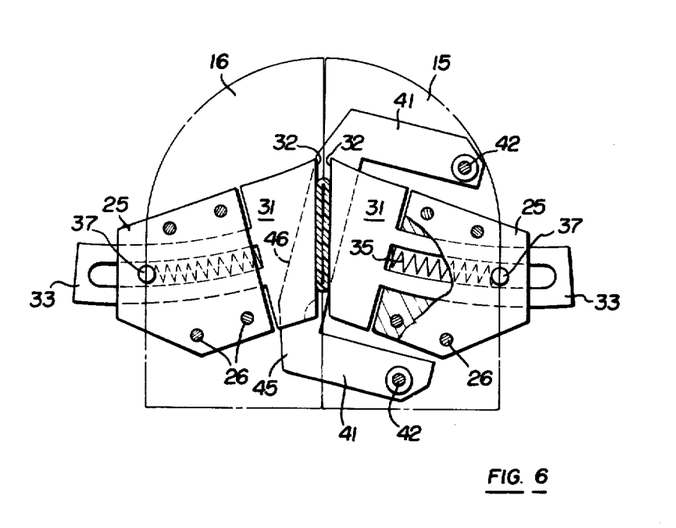
FIG. 6 is a view similar to FIGS. 2 and 4 but illustrating the relative positions of the elements of FIG. 5.

The action upon opening of the blow molds following the blowing operation is the reverse of that which has been earlier described, i.e., the relative movement of the parts proceeds from that illustrated in FIG. 6 to that illustrated in FIG. 4 to that illustrated in FIG. 2. By this opening movement, the parison-engaging surfaces 32 remain in contact with the parison as the blow mold sections 15, 16 are opened, and as the knife edge 46 is retracted from contact with the parison. This continued contact of the surfaces 32 with the parison insures that the blown article is stripped accurately from the mold cavity 17 by simply retaining the article in its vertical pendent position. Further, frictional contact of the knife with the parison as the knife is withdrawn does not deflect the blown article as to the pendant vertical position.

As above explained, this mechanism is particularly usable with the apparatus and method disclosed and claimed in the earlier Criss et al application assigned to the assignee of the present invention. In the Criss et al. application, a pair of blow molds are utiilized at a single extrusion orifice 11. These blow molds are closed on the tubular parison, moved downwardly with the parison during the blowing operation, opened and then returned in their opened position to the extrusion orifice 11, for the next blow molding operation. The operating cycle is such that both blow molds are closed on the parison for a short period of time. In other words, it takes less time to return the blow mold towards the orifice, than it does to move the blow mold downwardly with the parison after it has been closed.

Figure 7:
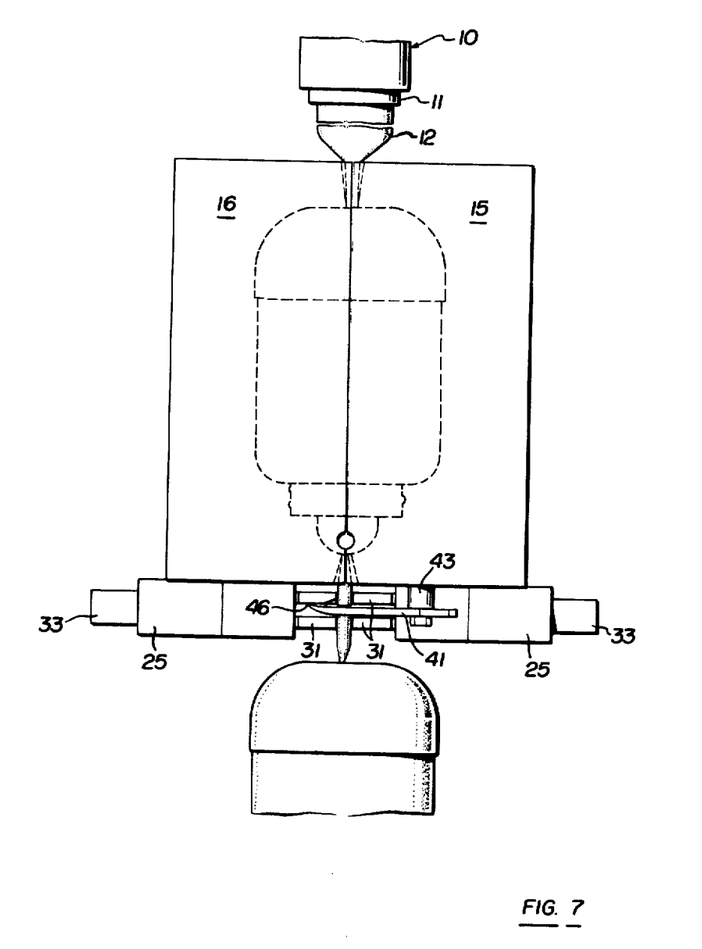
FIG. 7 is a view similar to FIG. 5 but showing the operation in connection with a subsequently blown second article.

This type of operation can be utilized to advantage in conjunction with the present mechanism. As illustrated in FIG. 7 of the drawings, the utilization of the two edges 32 on each blow mold section and the severing by the knife blade 46 between these pairs of edges 32 can result in the retention of a previously blown bottle by the lower pair of edges 32 after the mold in which this article has been formed has been opened and returned toward the extrusion orifice 11. This article simply dangles from the edges 32 in the open air for cooling by ambient air currents before being released from the edges 32 which are carried by the next successive mold.

Further, since the next successive mold closes on the parison before the mold in which the blown article is formed is opened, the parison is axially engaged both above and below the blow molds and the blow mold sections 15 and 16 at the time the blow mold sections are opened. In other words, the blow mold being opened has its parison engaged by the surfaces 32 carried by the blow mold and by the edges 32 of the next successive blow mold superimposed over the blow mold being opened. In this way, the molded article is retained by residual portions of the parison, both above and below the blown article at the time the blown article is stripped from its own blow mold. This gives a substantial advantage in insuring the accurate and complete stripping of the blown article from the blow mold while retaining the blown article in exact axial alignment with the extrusion orifice.

We claim:

1. In a method of blow molding a thermoplastic article, the steps of:
    1. extruding a tubular parison along an axis of extrusion;
    2. closing mold sections radially of the extrusion axis onto the parison to enclose the parison in a blow molding cavity;
    3. during the closing movement of the mold sections:
        a. engaging opposed sides of the parison with pairs of axially spaced engaging surfaces located exteriorly of the mold cavity, the surfaces of each such pair being radially aligned with the corresponding surfaces of the other pair;
        b. pinching the parison shut by said parison engaging surfaces prior to full closure of the mold sections; and
        c. severing the pinched parison portion between the axially spaced surfaces prior to full closure of the mold sections;
    4. continuing to grip the pinched shut parison portions with the axially spaced engaging surfaces after severing; and
    5. blowing the mold-enclosed parison portion to the configuration of the blow molding cavity.

2. In a method of blow molding containers of thermoplastic material, the steps of:
    extruding a tubular plastic parison from an annular orifice;

closing laterally disposed sets of parison engaging surfaces onto a portion of the parison spaced from the orifice, each such set including a pair of vertically spaced surfaces horizontally aligned with the corresponding surfaces of the other set;

pinching shut the engaged parison portion by movement of the sets of laterally disposed surfaces toward one another and then severing the parison between the vertically spaced, aligned engaging surfaces, thereby forming two distinct parison components;

gripping and retaining both severed parison components with the laterally opposed, vertically spaced engaging surfaces while closing sections of a cavity defining blow mold onto the parison component between the engaging surfaces and the annular orifice;

blowing the enclosed parison component to a container; and opening the mold sections while holding the gripped portion of the blown container with the engaging surfaces to strip the container from the opening mold sections.

3. The method as defined in claim 2, further including the steps of:

laterally displacing (a) the mold sections to an open position to expose a blown container and (b) the parison engaging surfaces to release the previously gripped parison component portions;

extruding additional tubular parison material from the annular orifice, the additional parison material being adjoined with the previously blown container;

closing laterally disposed sets of parison engaging surfaces onto a portion of the additional parison material between the blown container and the orifice, each such set including a pair of vertically spaced surfaces aligned with the corresponding surfaces of the other set;

pinching shut the engaged parison portion by movement of the laterally disposed sets of surfaces toward one another and then severing the parison between the vertically spaced, aligned engaging surfaces;

gripping the severed parison components, thereby suspending the previously blown container and stabilizing the additional tubular parison portion for central placement within a mold cavity; and closing sections of a cavity defining a blow mold onto the additional parison portion between the engaging surfaces and the annular orifice for formation of an additional blown container.

4. In a method of blow molding containers of thermoplastic material, the steps of:
1. extruding a tubular plastic parison downwardly from an annular orifice;
2. stabilizing the tubular parison for central location in a mold cavity during movement of cavity-defining mold sections from an opened position to a closed position to enclose a portion of the parison for formation of the thermosplastic container, by the sequential steps of:
   a. closing laterally disposed sets of parison engaging surfaces onto a portion of the parison spaced from the orifice, each such set including a pair of vertically spaced surfaces horizontally aligned with the corresponding surfaces of the other set;
   b. flattening the engaged parison portion by movement of the sets of laterally disposed surfaces toward one another and then severing the parison between the vertically spaced, aligned engaging surfaces, thereby forming the two distinct parison components; and
   c. gripping the severed parison components and closing the cavity-defining mold sections onto the parison component between the engaging surfaces and the annular orifice; and
3. blowing the enclosed parison component to a container.

5. In a method of continuously blow molding thermoplastic articles, the steps of:
1. continuously extruding freely pendant tubular thermoplastic parison material from an annular orifice;
2. horizontally stabilizing and aligning the tubular parison for closure thereon by first cavity-defining blow mold sections by:
   a. engaging a portion of the parison spaced from the orifice with first laterally disposed sets of parison engaging surfaces, each such set being interconnected with a respective mold section and including a pair of resiliently biased, vertically spaced surfaces horizontally aligned with the corresponding surfaces of the other set; and
   b. displacing the first laterally disposed sets of surfaces toward each other and flattening the engaged parison portion;
3. severing the flattened parison portion between the vertically spaced surfaces to form distinct, vertically separate parison components and thereafter retaining the parison components between the resiliently biased, laterally opposed, vertically spaced surfaces;
4. closing the first mold sections onto the parison component between the first engaging surfaces and the orifice, while engaging the flattened parison portions, by relatively moving the sections and the engaging surfaces under the biasing force on the surfaces;
5. moving the closed mold sections downwardly and blowing the mold-enclosed parison component to form a first thermoplastic container, while extruding additional tubular parison material;
6. horizontally stabilizing and aligning the additional tubular parison material for closure thereon by second cavity-defining blow mold sections by:
   a. engaging a portion of the additional parison spaced from the orifice with second laterally disposed sets of parison engaging surfaces, each such set being interconnected with a respective second cavity-defining mold section and including a pair of resiliently biased, vertically spaced surfaces horizontally aligned with the corresponding surfaces of the other set; and
   b. displacing the second laterally disposed sets of surfaces horizontally toward each other and flattening the engaged portion of the additional parison material;
7. severing the flattened portion of the additional parison material between the vertical spaced surfaces of the second sets of engaging surfaces, one portion of the severed material being integral with the previously formed container and the other portion of the severed material being integral with the additional parison material;
8. closing the second mold sections into the additional parison material portion between the second engaging surfaces and the orifice for formation of an additional container, while engaging the flattened, severed portions of the additional material with the second engaging surfaces;
9. opening the first mold sections while gripping the flattened parison portions with the first engaging surfaces and the flattened portion of the additional parison material with the second engaging surfaces to strip the first container from the first mold sections;
10. releasing the flattened parison portions from the first engaging surfaces, while gripping the flattened portion of the additional parison material that is integral with the first container with the second engaging surfaces, thereby suspending the container for cooling; and
11. vertically moving the first mold sections toward the orifice to repeat the molding cycle.

* * * * *

PO-1050
(5/69)

UNITED STATES PATENT OFFICE
CERTIFICATE OF CORRECTION

Patent No. 3,919,375          Dated November 11, 1975

Inventor(s) R.F. Kontz/R. A. Morrette

It is certified that error appears in the above-identified patent and that said Letters Patent are hereby corrected as shown below:

Column 9, line 3, "into" should be --onto--.

Signed and Sealed this second Day of March 1976

[SEAL]

Attest:

RUTH C. MASON
*Attesting Officer*

C. MARSHALL DANN
*Commissioner of Patents and Trademarks*